United States Patent
Kurian (10) Patent No.: US 10,387,203 B2
(45) Date of Patent: Aug. 20, 2019

(54) MACHINE LEARNING TASK COMPARTMENTALIZATION AND CLASSIFICATION

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 248 days.

(21) Appl. No.: 15/497,917

(22) Filed: Apr. 26, 2017

(65) Prior Publication Data

US 2018/0314562 A1    Nov. 1, 2018

(51) Int. Cl.
| | |
|---|---|
| *G06F 9/46* | (2006.01) |
| *G06F 9/50* | (2006.01) |
| *G06F 9/48* | (2006.01) |
| *G06F 16/435* | (2019.01) |
| *G06Q 10/06* | (2012.01) |
| *G06N 20/00* | (2019.01) |

(52) U.S. Cl.
CPC .......... *G06F 9/5027* (2013.01); *G06F 9/4843* (2013.01); *G06F 16/435* (2019.01); *G06Q 10/0639* (2013.01); *G06Q 10/06311* (2013.01); *G06N 20/00* (2019.01)

(58) Field of Classification Search
None
See application file for complete search history.

(56) References Cited

U.S. PATENT DOCUMENTS

| | | |
|---|---|---|
| 8,601,002 B1 | 12/2013 | Ali et al. |
| 9,053,157 B2 | 6/2015 | Ali et al. |
| 9,405,807 B2 | 8/2016 | Obernikhin et al. |
| 2014/0122355 A1 | 5/2014 | Hardtke et al. |
| 2014/0289143 A1 | 9/2014 | Coleman et al. |
| 2014/0289144 A1 | 9/2014 | Coleman et al. |
| 2015/0088568 A1 | 3/2015 | Lambroschini |
| 2015/0120351 A1 | 4/2015 | Dorner |
| 2015/0161566 A1 | 6/2015 | Cai |
| 2015/0317605 A1 | 11/2015 | Rao et al. |
| 2016/0098683 A1 | 4/2016 | Angulo et al. |
| 2016/0300191 A1 | 10/2016 | Leslie |

(Continued)

OTHER PUBLICATIONS

Broadbean Job Distribution, Job distribution software for the modern recruitment professional, CareerBuilder, LLC, retrieved from Internet Apr. 24, 2017, https://hiring.careerbuilder.com/recruiting-solutions/job-distribution.

(Continued)

*Primary Examiner* — Gregory A Kessler
(74) *Attorney, Agent, or Firm* — Banner & Witcoff, Ltd.; Michael A. Springs (57) ABSTRACT

Systems, methods, and apparatus for machine learning task compartmentalization and classification are disclosed. An example method comprises receiving, from a first computing device, user defined parameters associated with at least one user, receiving, from a second computing device, auxiliary data associated with the at least one user, generating, by a third computing device, at least one work profile based on the received user defined parameters and auxiliary data, and determining, by the third computing device, an affinity between a task component and the generated at least one work profile.

7 Claims, 8 Drawing Sheets

(56) References Cited

U.S. PATENT DOCUMENTS

2016/0379170 A1  12/2016  Pande
2017/0032322 A1   2/2017  Grover et al.

OTHER PUBLICATIONS

Machine learning, Wikipedia, The Free Encyclopedia, retrieved from Internet Apr. 11, 2017, https://en.wikipedia.org/wiki/Machine_learning.

MACHINE LEARNING TASK COMPARTMENTALIZATION AND CLASSIFICATION

TECHNICAL FIELD

Aspects of the present disclosure generally relate to data processing and utilizing machine learning algorithms to compartmentalize and classify tasks across numerous computing devices.

BACKGROUND

As digital data becomes more accessible to computing systems, such computing systems may have difficulty identifying particular data assets amongst the data accumulation. Even further, users associated with such data assets may also become obfuscated. Accordingly, it may be difficult to compartmentalize and classify tasks amongst numerous computing devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure concern compartmentalizing and classifying tasks and/or components of tasks amongst numerous computing devices based on machine learning algorithms, which may use task parameters and user profiles to generate and/or identify an affinity between a particular task or task component and a particular user profile associated with a particular computing device.

An example system comprises a task assigner server comprising one or more processors and memory comprising instructions, that when executed by the one or more processors, cause the task assigner server to receive, from a first computing device, task information identifying a plurality of skillsets associated with a task; based on receiving the task information, request, from a database server, at least one work profile associated with at least one skillset of the plurality of skillsets associated with the task; receive, from the database server, the at least one work profile associated with the at least one skillset, wherein the at least one work profile associated with at least one skillset comprises an identifier associated with a second computing device; determine whether an affinity between a component of the task and the at least one work profile associated with the at least one skillset satisfies a threshold; and in response to determining that the affinity between the component of the task and the at least one work profile associated with the at least one skillset satisfies the threshold, allocate, to the at least one work profile, the component of the task. In addition, the system may further comprise a task processor server comprising: one or more second processors; and memory comprising second instructions, that when executed by the one or more second processors, cause the task processor server to: monitor progress information associated with one or more allocated components of the task; based on monitoring the progress information, identify that the allocated component of the task has been completed; and based on determining that the allocated component of the task has been completed, transmit, to the second computing device, compensation information associated with the allocated component of the task.

An example apparatus comprises one or more processors, and memory comprising instructions that, when executed by the one or more processors, cause the apparatus to at least identify a task associated with a plurality of skillsets, query a database server for at least one work profile associated with at least one skillset of the plurality of skillsets, generate an affinity between the at least one work profile and a task component associated with the at least one skillset, and in response to determining that the affinity satisfies a threshold, allocate, to the at least one work profile, the task component.

An example method comprises receiving, from a first computing device, user defined parameters associated with at least one user, receiving, from a second computing device different from the first computing device, auxiliary data associated with the at least one user, generating, by a third computing device, at least one work profile based on the received user defined parameters and auxiliary data, and determining, by the third computing device, an affinity between a task component and the generated at least one work profile.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

Some aspects of the disclosure relate to allocating one or more components of a task to different members of a highly qualified workforce based on parameters of the task and one or more workforce factors. In some examples, machine learning algorithms are utilized to determine an affinity or suitability between workforce members and task components. The systems, methods, and apparatus disclosed herein distribute components to workforce members having high suitability for the components, analyze progress of allocated components, review completed components for quality, and appropriately distribute compensation.

Some example models disclosed herein determine a task component affinity or suitability score for work profiles based on task, skillset, number of resources, current and historical on-time delivery, current and historical delivery complexity, risk levels, controls, visibility, impact, certifications, current and historical milestones tracking, cost per unit work, total cost and average cost per program/task. Tasks may be allocated to work profiles associated with users based on each work profile's affinity towards a task component.

For example, the systems, methods, and apparatus may be utilized to distribute a website building task requiring experience in both JavaScript and .NET framework. In some examples, users may be familiar with either JavaScript or .NET framework, but not both. Many challenges may be involved if such a task was allocated to a user familiar with JavaScript, but not .NET framework (or familiar with .NET framework, but not JavaScript). The example systems, methods, and apparatus disclosed herein may identify a first work profile associated with a first user having a first skillset (e.g., JavaScript) and identify a second work profile associated with a second user having a second skillset (e.g., .NET framework). In some examples, the disclosed systems, methods, and apparatus divide the task into a JavaScript component and a .NET framework component and determine whether the corresponding work profiles have high affinities for the components. If the first work profile associated with the first user having the first skillset (e.g., JavaScript) has a high affinity for the JavaScript task, the first work profile may be allocated the JavaScript task. Similarly, if the second work profile associated with the second user having the second skillset (e.g., .NET framework) has a high affinity for the .NET framework task, the second work profile may be allocated the .NET framework task. In some examples, the disclosed systems, methods, and apparatus allocate the task to a combined work profile comprising the first work profile and the second work profile.

As the users corresponding to the work profiles allocated components under the task complete their components, the disclosed systems, methods, and apparatus may track progress and quality of the completed components. Such information may be used to make such work profiles more or less likely to be chosen in the future for similar components (e.g., increase or decrease task affinities). Additionally, the disclosed systems, methods, and apparatus may appropriately distribute compensation upon completion.

An example system to manage task component distribution comprises a task assigner server comprising one or more first processors, and memory comprising first instructions, that when executed by the one or more first processors, cause the task assigner server to receive, from a first computing device, a task information identifying a plurality of skillsets associated with a task, based on receiving the task information, request, from a database server, at least one work profile associated with at least one skillset of the plurality of skillsets associated with the task, receive, from the database server, the at least one work profile associated with the at least one skillset, wherein the at least one work profile associated with at least one skillset comprises an identifier associated with a second computing device, determine whether an affinity between a component of the task and the at least one work profile associated with the at least one skillset satisfies a threshold, and in response to determining that the affinity between the component of the task and the at least one work profile associated with the at least one skillset satisfies the threshold, allocate, to the at least one work profile, the component of the task; and a task processor server comprising, one or more second processors and memory comprising second instructions, that when executed by the one or more second processors, cause the task processor server to monitor progress information associated with one or more allocated components of the task, based on monitoring the progress information, identify that the allocated component of the task has been completed, and based on determining that the allocated component of the task has been completed, transmit, to the second computing device, compensation information associated with the allocated component of the task.

In some examples, to allocate, to the at least one work profile, the component of the task, the first instructions, when executed by the one or more first processors, cause the task assigner server to generate one or more commands directing the second computing device to execute one or more actions associated with the task; and send, to the second computing device, the one or more commands directing the second computing device to execute the one or more actions associated with the task.

In some examples, to receive the at least one work profile associated with the at least one skillset of the plurality of skillsets, the first instructions, when executed by the one or more first processors, cause the task assigner server to divide the task into a plurality of components of the task, wherein each component of the task of the plurality of components of the task is associated with a skillset of the plurality of skillsets, and receive a respective work profile for each component of the task of the plurality of components of the task.

In some examples, the first instructions, when executed by the one or more first processors, cause the task assigner server to divide the task into the plurality of task components based on at least one of type of skillset, amount of work, confidentiality, urgency, or any combination thereof.

In some examples, the at least one work profile is a combined profile comprising at least a first work profile and a second work profile, the first work profile is associated with a first user having a first skillset of the plurality of skillsets and the second work profile is associated with a second user having a second skillet of the plurality of skillsets.

In some examples, the system further comprises a profile generator server comprising one or more third processors and memory comprising third instructions, that when executed by the one or more third processors, cause the profile generator server to receive user-defined parameters associated with at least one user, receive auxiliary data associated with the at least one user generate, based on received user-defined parameters and auxiliary data, the at least one work profile, and generate the affinity between the task component and the generated at least one work profile.

In some examples, the third instructions, when executed, cause the profile generator to generate a model based on the at least one work profile, wherein the component of the task is an input to the generated model and the affinity is an output of the generated model.

An example apparatus to allocate task components to work profiles comprises one or more processors, and memory comprising instructions that, when executed by the one or more processors, cause the apparatus to at least identify a task associated with a plurality of skillsets, query a database server for at least one work profile associated with at least one skillset of the plurality of skillsets, generate an affinity between the at least one work profile and a task component associated with the at least one skillset, and in response to determining that the affinity satisfies a threshold, allocate, to the at least one work profile, the task component.

In some examples, the instructions, when executed, further cause the apparatus to receive, from a first computing device, user defined parameters associated with at least one user, receive, from a second computing device different from the first computing device, auxiliary data associated with the at least one user, and generate, based on received user defined parameters and auxiliary data, the at least one work profile.

In some examples, the instructions, when executed, further cause the apparatus to monitor progress information of the allocated task component, and determine, based on the allocated task component, compensation information for the at least one work profile.

In some examples, the instructions, when executed, further cause the apparatus to divide the task into a plurality of task components, wherein each task component of the plurality of task components is associated with a skillset of the plurality of skillsets, and determine a respective work profile for each task component of the plurality of task components.

In some examples, the at least one work profile is a combined profile comprising at least a first work profile and a second work profile, wherein the first work profile is associated with a first skillset of the plurality of skillsets and the second work profile is associated with a second skillet of the plurality of skillsets.

In some examples, the instructions, when executed, further cause the apparatus to generate a model based on the at least one work profile, wherein the task component is an input to the generated model and the affinity is an output of the generated model.

An example method to determine the suitability of one or more work profiles for a task component comprises receiving, from a first computing device, user defined parameters associated with at least one user, receiving, from a second computing device different from the first computing device, auxiliary data associated with the at least one user, generating, by a third computing device, at least one work profile based on the received user defined parameters and auxiliary data, and determining, by the third computing device, an affinity between a task component and the generated at least one work profile.

In some examples, the task component is associated with a plurality of skillsets, the at least one work profile is a combined profile comprising at least a first work profile and a second work profile, the first work profile is associated with a first user having a first skillset of the plurality of skillsets, and the second work profile is associated with a second user having a second skillet of the plurality of skillsets.

In some examples, the user defined parameters correspond to skillsets, certifications, or billable rate and wherein the auxiliary data corresponds to a completion history of task components assigned to the at least one work profile, a reputation, a history of task complexity, user behavior, or risk factors.

In some examples, the method further comprises generating a model based on the at least one work profile, wherein the determining the affinity between the task component and the generated at least one work profile comprises applying the task component to the generated model and receiving the affinity as an output of the generated model.

In some examples, the method further comprises identifying, by the third computing device, a task associated with a plurality of skillsets, determining the task component is associated with at least one skillset of the plurality of skillsets, wherein the determining the affinity between the task component and the generated at least one work profile is based on the at least one skillset, and in response to determining that the affinity satisfies a threshold, allocating the task component to the at least one work profile.

In some examples, the method further comprises dividing the task into a plurality of task components, wherein each task component of the plurality of task components is associated with a skillset of the plurality of skillsets; and identifying, based on respective affinities, a respective work profile for each task component of the plurality of task components.

In some examples, the dividing is based on at least one of skillset, amount of work, confidentiality, urgency, or any combination thereof.

Figure 1:
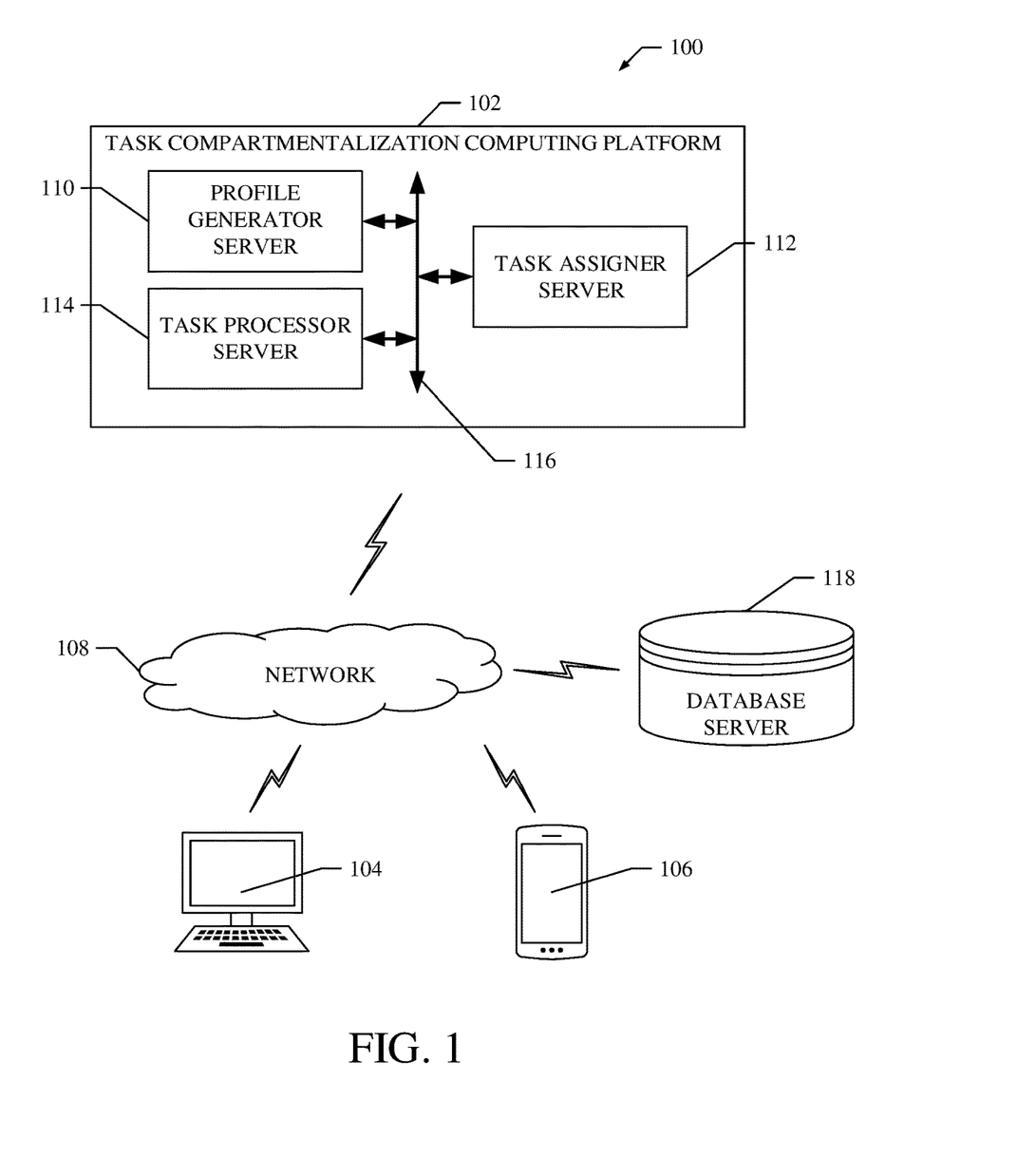
FIG. 1 depicts an example computing environment for utilizing machine learning algorithms to compartmentalize and classify tasks across numerous computing devices according to one or more illustrative examples.

FIG. 1 illustrates an example environment 100 comprising a task compartmentalization computing platform 102 in communication with a first computing device 104 and/or a second computing device 106 via a network 108. While the example first computing device 104 is illustrated as a desktop computer and the example second computing device 106 is illustrated as a mobile device, the first computing device 104 and/or the second computing device 106 may be any computing device with network capabilities and/or access to workload distribution software or applications.

In some examples, users may utilize the first computing device 104 and/or a second computing device 106 to access the systems, methods, and apparatus disclosed herein. Alternatively, the first computing device 104 and/or a second computing device 106 may be the users of the present systems, methods, and apparatus in computer resource utilization examples. For example, computer processing components may be allocated to different computing devices according to the systems, methods, and apparatus disclosed herein. In such examples, each computing device may be associated with a computer generated work profile defining its capabilities such as processing power, network speed, storage space, and/or the like. In some examples, a task requesting entity may utilize the first computing device 104 to request a task to be completed and a user may utilize the second computing device 106 to generate a work profile and/or receive allocated components corresponding to tasks requested by task requesting entities.

The example task compartmentalization computing platform 102 of FIG. 1 may comprise a profile generator server 110, a task assigner 112, and a task processor server 114. The example profile generator server 110, the example task assigner 112, and the example task processor server 114 may be in communication via a communication channel such as, for example, bus 116.

The first computing device 104, the second computing device 106, and/or the task compartmentalization computing platform 102 may be in communication with a database server 118. The example database server 118 may comprise a plurality of user profiles created to be matched to particular components of tasks. For example, users of workload allocation systems may create work profiles, accounts, or other system identities (via second computing device 106) in order to be considered for task components. In some examples, profiles may be computer generated based on publically available information. As users perform allocated components, events with which the user is associated (e.g., task milestones) may be recorded, analyzed, or otherwise stored for the benefit of the user and the systems. The example database server 118 may consolidate one or more databases associated with the one or more work profiles. In some examples, the identity of the user associated with a work profile is hashed or otherwise obfuscated. As disclosed herein, the database server 118 may be sorted or ranked according to work profile ratings or task affinities. The example database server 118 may be manually searchable for manual task allocation.

The example profile generator server 110 generates work profiles and work profile ratings based on user-defined parameters and auxiliary data. Examples of user-defined parameters may include name, age, skillset(s), experience, certifications, billable rate, and/or the like. Users may enter user-defined parameters into work profiles using, for example, the second computing device 106. Examples of auxiliary data may include a completion history of components assigned to the work profile (e.g., a percentage representing completed components out of all allocated components), a reputation (e.g., a rating and/or favorable/unfavorable recommendations), a history of task complexity (e.g., allocated components are of low complexity, high complexity, average complexity, or any combination thereof), user behavior (e.g., shows up late to work, leaves early, doesn't follow rules, doesn't work well with others, and/or the like.), risk factors (e.g., user divulges confidential information on social media, takes numerous photos of work, under criminal investigation, involved in one or more lawsuits, has poor credit, and/or the like.), and/or the like. In some examples, the auxiliary data is acquired from third party database services, tracking applications and/or software on user devices, and/or from the example task compartmentalization computing platform 102. In order to generate the work profile ratings, the example profile generator server 110 may build one or more models based on the contents of the database server 118. In some examples, the one or more models are built using machine-learning algorithms using the user-defined parameters and auxiliary data. In some examples, the one or more models balance the above factors to generate the work profile rating. For example, a user may define parameters that make the user's work profile attractive, however, the user may be involved in behavior that neutralizes the user's work profile (e.g., the user has a low billable rate but is often late, the user has great experience but often discloses confidential information, and/or the like.). Alternatively, the user may define parameters that make the user's work profile unattractive, however, the user may be involved in behavior that strengthens the user's work profile (e.g., the user has a high billable rate but is rarely late, the user has low experience but is professional and maintains confidentiality, and/or the like.). The example one or more models may receive the above described factors as inputs and output work profile ratings indicative of general work profile desirability.

The example profile generator server 110 may additionally generate affinities between task components and work profiles using the one or more generated models. The generated affinities may be a score indicating a probability that the one or more work profiles are suitable to complete the new task. For example, if there are three work profiles, a first work profile may have an affinity of 0.73, a second work profile may have an affinity of 0.16, and a third work profile may have an affinity of 0.11. In some examples, the affinities may be normalized across all work profiles such the affinities add to 1. Alternatively, the affinities may be any value indicating the suitability of a work profile for a particular task.

The affinity determination may be based on task parameters, work profiles, and the work profile ratings. The example profile generator server 110 may refine and/or train the one or more generated models for affinity analysis by testing the accuracy of iterations of the model using parameters of a previously requested task (or test task parameters) and comparing the output of the model to the historical result of the previously requested task (or test task parameters). The example profile generator server 110 may continue to update the one or more models with new data until the one or more models are considered to have an optimal accuracy. An optimal accuracy may be determined by recording accuracy tests over time, determining that the accuracy decreases a first threshold number of times after the accuracy has increased a second threshold amount of times (i.e., to distinguish a maximum from a local maxima), and determining the model iteration associated with the last increase is the optimal model with an optimal accuracy.

The example task assigner server 112 may receive tasks, divide the tasks into components, and allocate the task components to work profiles. In some examples, the task assigner server 112 allocates tasks or components to a combined work profile. In some examples, the task assigner server 112 cooperates with third party services to acquire work profiles and or users. In some examples, the tasks or components are allocated to one or more work profiles based on parameters such as, for example, required skillsets, number of resources, current and historical on-time delivery, current and historical delivery complexity, risk levels, controls, visibility, impact, certifications, current and historical milestones tracking, cost per unit work, total cost, average cost per program/task, and/or the like. In some examples, the task assigner server 112 submits a new task as an input to the one or more models generated by the profile generator and receives work profile affinity scores output from the one or more models. In such examples, the task assigner server 112 allocates components to work profiles based on such affinity scores. For example, the task assigner server 112 may compare affinity scores of work profiles to a threshold and allocate components if the affinity scores satisfy the threshold. The example threshold may be a static number (e.g., 0.90) or may be a function such as identify the work profile with the highest affinity (e.g., a ceiling function).

In some examples, one or more overseer components may be allocated in addition to the components based on task parameters. For example, an overseer may oversee performance of a first task allocated to a first work profile and performance of a second task allocated to a second work profile. The overseer may step-in, guide, or otherwise help either user in order to maintain compliance with parameters of the components. In some examples, work profiles may be allocated a back-up role to take over for a user if he or she fails to perform the allocated task.

The example task processor server 114 analyzes performance and completion of tasks and/or components. For each allocated task or task, the example task processor server 114 may collect milestone data including progress of work, number of resources consumed, time elapsed, and/or the like. The milestone data may be collected periodically based on time, task component steps, cost, and/or the like. Based on the milestone data, the example task processor server 114 may determine whether the task and/or task component is on schedule for completion based on the task parameters at the time the task and/or task was allocated. The task processor server 114 may adjust timelines, compensation, and/or other parameters of a task based on the progress of a task component and/or task.

In some examples, the task processor server 114 analyzes the quality of completed tasks. For example, the task processor server 114 may test products created based on the allocated components (e.g., physical objects, software code, and/or the like.). The task processor server 114 may compare the completed components and/or task to one or more known standards or one or more standards defined by the parameters of the task request. The example task processor server 114 may determine compensation and may disperse the compensation to corresponding work profiles. In some examples, the example task processor server 114 provides a task requesting entity a single bill for the entire task and receives a single compensation amount. In such examples, the single compensation amount is divided by the task processor server 114 based on the work profiles involved in completion of the task. In some examples, the task processor server 114 may send multiple bills to the task requesting entity, wherein each bill is associated with a single task.

Figure 2:
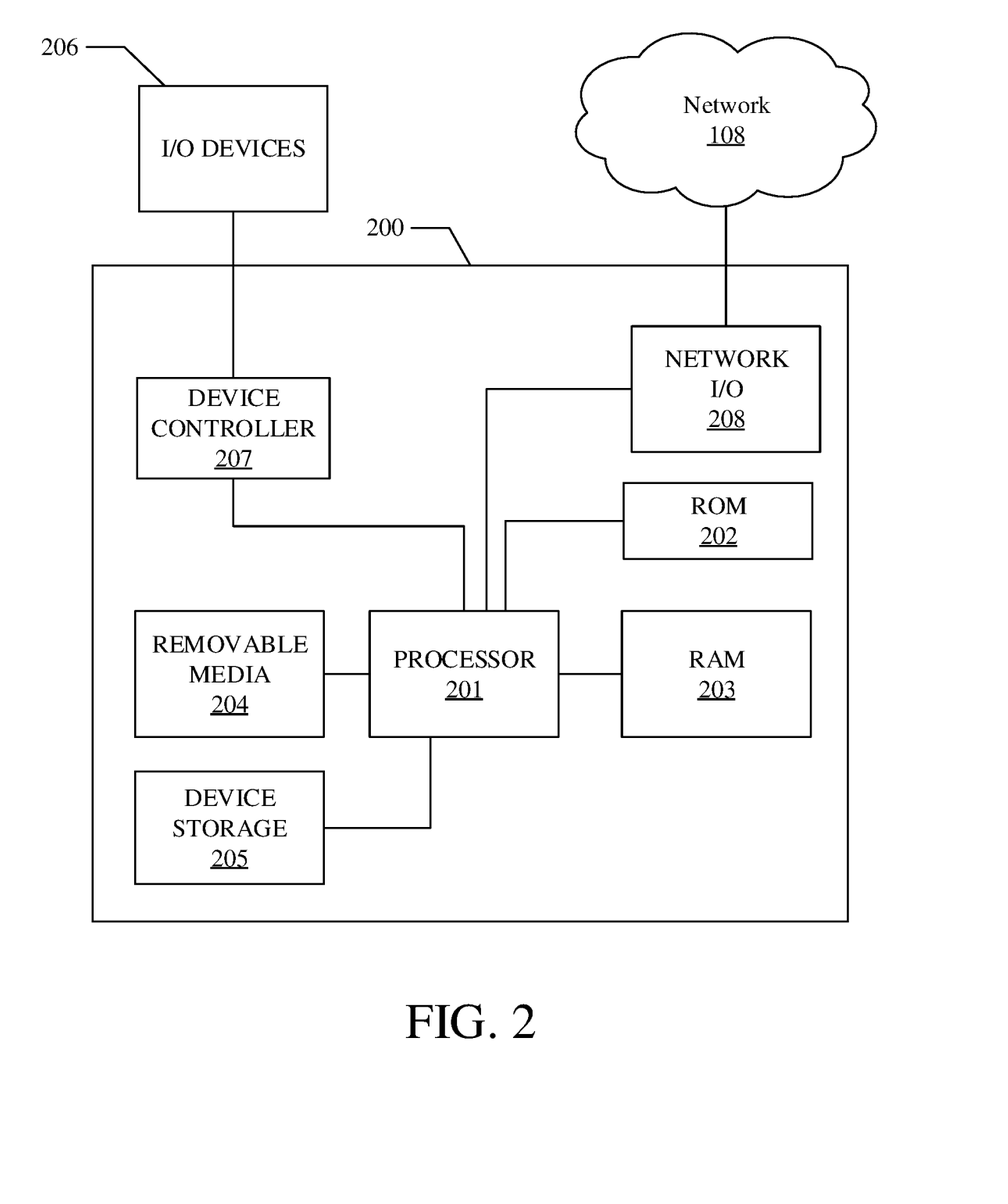
FIG. 2 depicts an example of a specifically configured computing device for utilizing machine learning algorithms to compartmentalize and classify tasks across numerous computing devices according to one or more illustrative embodiments.

The example profile generator server 110, the example task assigner server 112, the example task processor server 114, and/or more generally, the example task compartmentalization computing platform 102, the example first computing device 104, the example second computing device 106, and/or other computing devices described herein may be implemented via a hardware platform such as, for example, the computing device 200 illustrated in FIG. 2. Some elements described with reference to the computing device 200 may be alternately implemented in software. The computing device 200 may include one or more processors 201, which may execute instructions of a computer program to perform one or more of the features described herein. For example, the example profile generator server 110, the example task assigner 112, and/or the example task processor server 114 may be implemented by the one of more processors 201 executing instructions stored in memory. The instructions may be stored in a tangible computer-readable storage medium or memory, to configure the operation of the processor 201. As used herein, the term tangible computer-readable storage medium is expressly defined to include storage devices or storage discs and to exclude transmission media and propagating signals. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. Additionally, the example database server 118 may be implemented on the read-only memory (ROM) 202, random access memory (RAM) 203, removable media 204, such as a Universal Serial Bus (USB) drive, compact disk (CD) or digital versatile disk (DVD), floppy disk drive, the attached (or internal) hard drive 205, or any other desired electronic storage medium. The computing device 200 may include one or more input/output devices 206, such as a display, touch screen, keyboard, mouse, microphone, software user interface, and/or the like. The computing device 200 may include one or more device controllers 207 such as a video processor, keyboard controller, and/or the like. The computing device 200 may also include one or more network interfaces 208, such as input/output circuits (such as a network card) to communicate with a network such as the example network 108. The network interface 208 may be a wired interface, wireless interface, or a combination thereof.

Figure 3A:
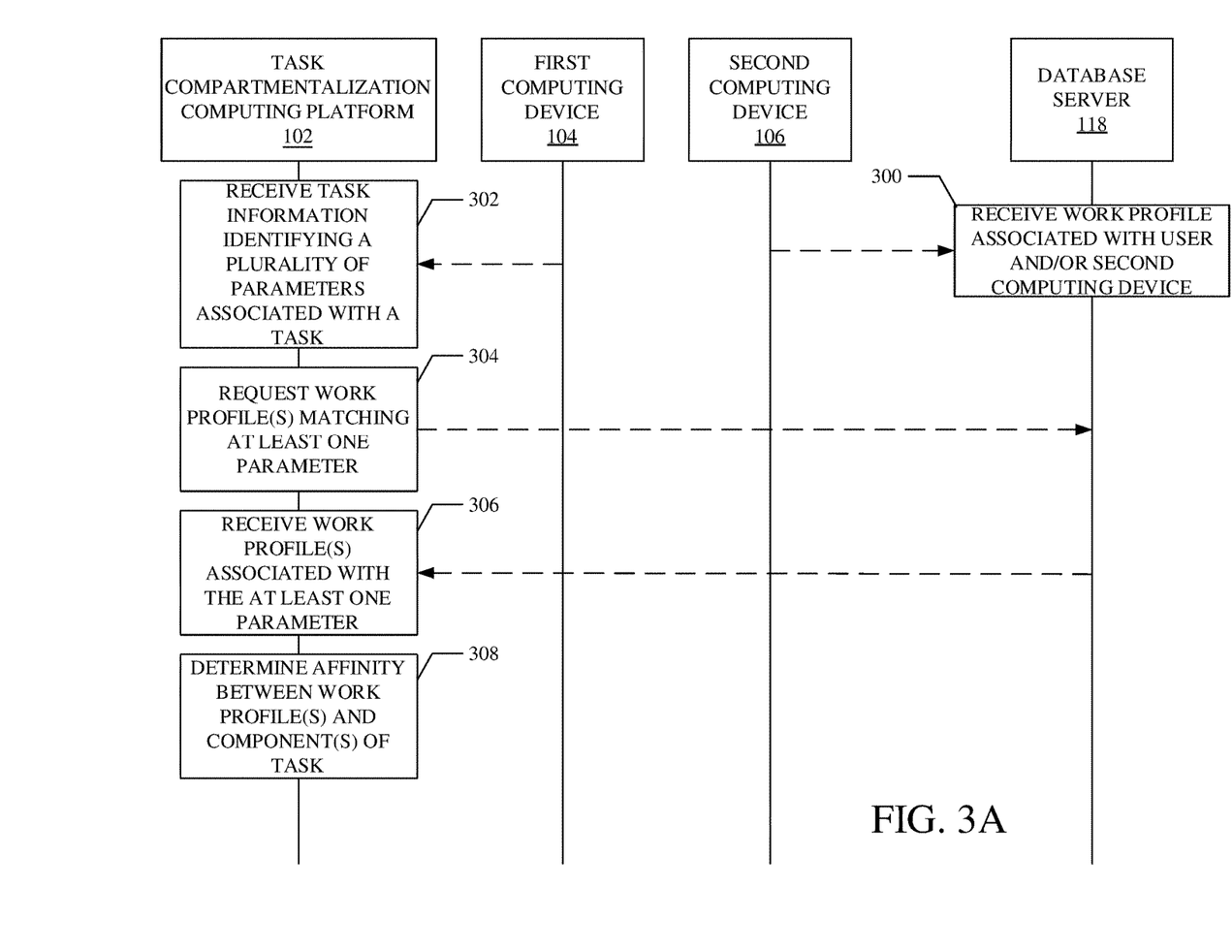
FIGS. 3A-3B depict an example event sequence for utilizing machine learning algorithms to compartmentalize and classify tasks across numerous computing devices according to one or more illustrative embodiments.
Figure 3B:
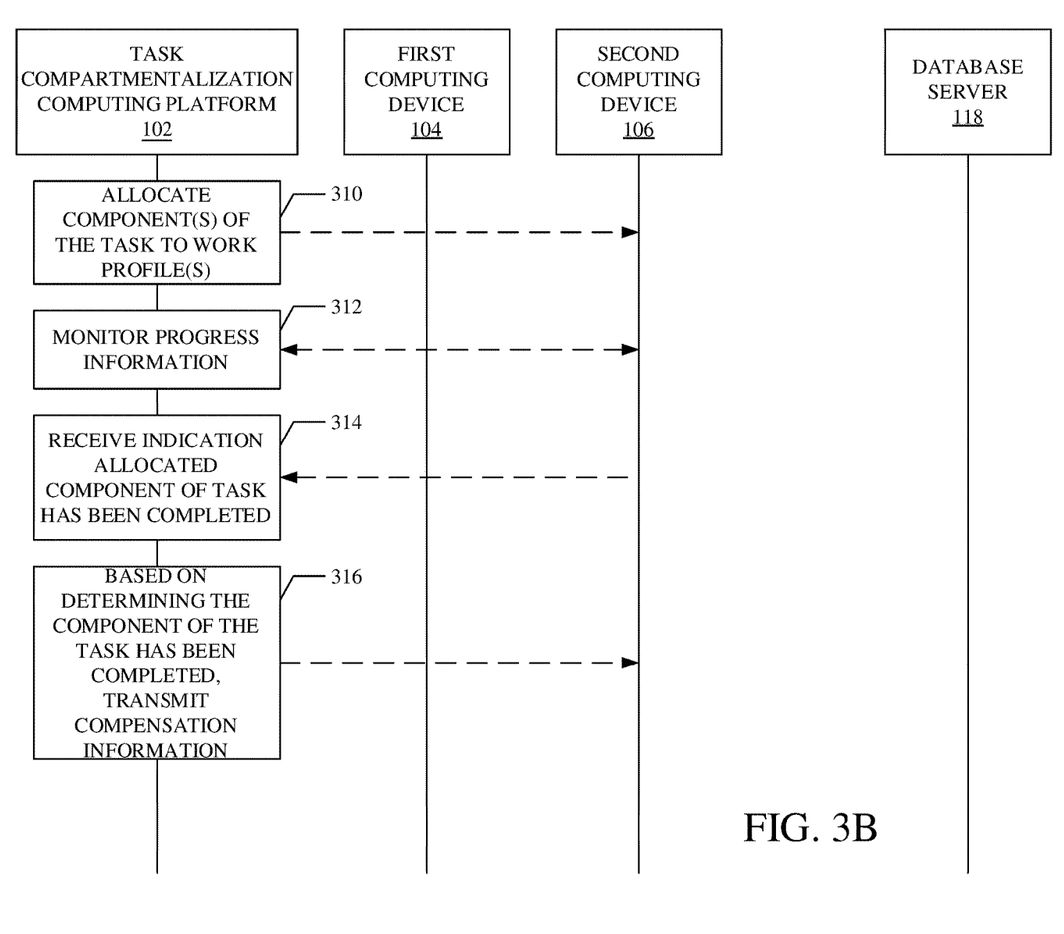

FIGS. 3A-3B illustrate an event sequence for machine learning task compartmentalization and classification in accordance with one or more disclosed examples. As illustrated in FIG. 3A, at step 300 the example database server 118 receives work profiles associated with one or more users utilizing one or more second computing devices 106. As disclosed herein, a work profile may be created by a user based on one or more user-defined parameters. In some examples, the work profile comprises an identifier of the second computing device 106 the user utilized to generate the work profile.

At step 302, the task compartmentalization computing platform 102 receives task information identifying a plurality of parameters (e.g., skillsets) associated with a task. At step 304, based on the received task information, the task compartmentalization computing platform 102 requests, from the database server 118, at least one work profile associated with at least one parameter (e.g., skillset) of the plurality of parameters (e.g., skillsets) associated with the task. At step 306, the task compartmentalization computing platform 102 receives, from the database server 118, the at least one work profile associated with at least one parameter (e.g., skillset) of the plurality of parameters (e.g., skillsets) associated with the task. At step 308, the task compartmentalization computing platform 102 determines an affinity between a component of the task and the at least one work profile associated with the at least one skillset. In some examples, the task compartmentalization computing platform 102 determines whether the affinity between the component of the task and the at least one work profile associated with the at least one skillset satisfies a threshold.

As illustrated in FIG. 3B, at step 310 in response to determining that the affinity between the component of the task and the at least one work profile associated with the at least one skillset satisfies the threshold, the task compartmentalization computing platform 102 allocates, to the at least one work profile, the component of the task, wherein the allocation is to the second computing device 106 based on the identifier within the at least one work profile. At step 312, the task compartmentalization computing platform 102 monitors progress information associated with one or more allocated components of the task. In some examples, such monitoring is done across numerous computing devices based on the respective identifiers associated with the respective work profiles that have been allocated components of the task. At step 314, the task compartmentalization computing platform 102 identifies, based on monitoring the progress information, that the allocated component of the task has been completed. For example, the second computing device 106 may send an indication that the allocated component of the task has been completed. At step 316, based on determining that the allocated component of the task has been completed, the task compartmentalization computing platform 102 transmits, to the second computing device, compensation information associated with the allocated component of the task.

Figure 4:
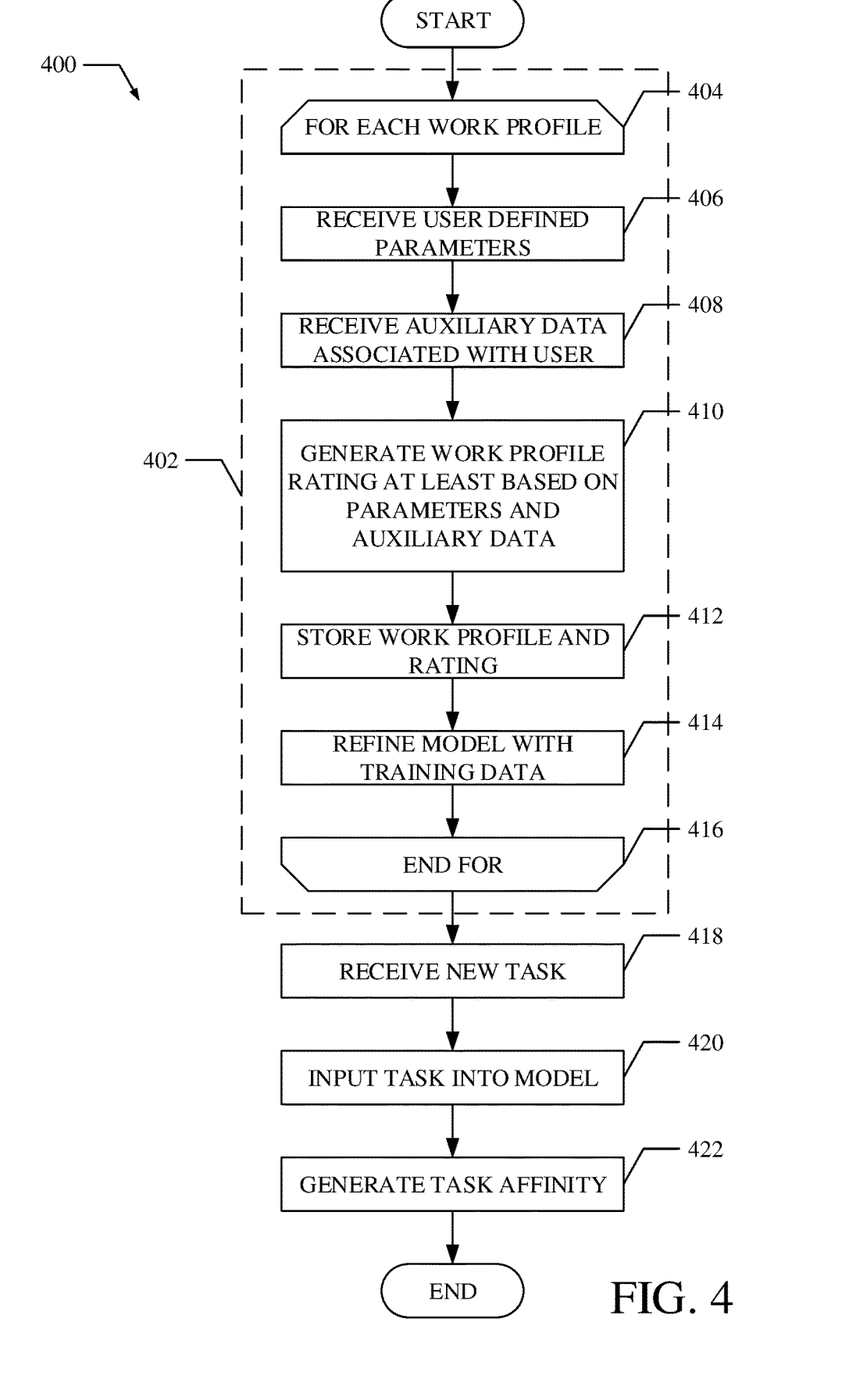
FIGS. 4-7 depict example methods of utilizing machine learning algorithms to compartmentalize and classify tasks across numerous computing devices according to one or more illustrative embodiments.

FIG. 4 illustrates a flow chart representative of machine readable instructions that, when executed, may cause a computing device to implement a process 400 to generate user work profiles and compare new components to determine an affinity between the work profiles and the new task. The example process 400 begins with the profile generator server 110 generating a model based on at least one work profile (block 402). The model may be generated using any number of using machine-learning algorithms such as decision trees, neural networks, and/or the like. As illustrated in FIG. 4, the profile generator server 110 may iteratively generate the model by using, for example, a for loop. In some instances, other iterative or non-repetitive methods may be utilized to generate the model.

As described above, each user of the example systems, methods, and apparatus disclosed herein may create a work profile based on one or more user defined parameters such as, for example, name, age, skillset, experience, certifications, billable rate, and/or the like. Such work profiles may be stored in the example database server 118. Block 404 of example process 400 may begin the example for loop disclosed above, executing blocks 406-414 for each work profile in the example database server 118. For example, for each work profile, the example profile generator server 110 receives the respective user-defined parameters. At block 408, the example profile generator server 110 may further receive auxiliary data corresponding to the respective users. As disclosed herein, such auxiliary data may comprise a completion history of components assigned to the at least one work profile (e.g., a percentage representing completed components out of all allocated components), a reputation (e.g., a rating and/or favorable/unfavorable recommendations), a history of task complexity (e.g., allocated components are of low complexity, high complexity, average complexity, or any combination thereof), user behavior (e.g., shows up late to work, leaves early, doesn't follow rules, doesn't work well with others, and/or the like.), or risk factors (e.g., user divulges confidential information on social media, takes numerous photos of work, under criminal investigation, involved in one or more lawsuits, has poor credit, and/or the like.).

At block 410, the example profile generator server 110 generates a work profile rating based on at least the user-defined parameters and the auxiliary data. At block 412, the example profile generator server 110 may store, in the example database server 118, the work profile in association with the rating generated at block 410. In some examples, the database server 118 is sorted based on work profile ratings for both manual review and for more efficient computer processing. For example, if multiple work profiles are identified as corresponding to a parameter of a task or task, a work profile with a higher work profile rating may be selected over all other work profiles.

In some examples, the model is refined using training data to prepare the model for determining an affinity between work profiles and a new task (block 414). Such training data may include components targeted to the one or more existing work profiles. For example, a first task may be created requiring all the parameters of a first work profile. Accordingly, when the first task is exposed to the model, the model should identify the first work profile with a high likelihood of success. Such training data may be applied for one or more work profiles to refine the model such that the accuracy of the model for future task is optimized. An optimal accuracy may be determined by recording accuracy tests over time, determining that the accuracy decreases a first threshold number of times after the accuracy has increased a second threshold amount of times (i.e., to distinguish a maximum from a local maxima), and determining the model iteration associated with the last increase is the optimal model with an optimal accuracy. At block 416, the for loop ends.

As described above, a model is generated based on the work profiles, work profile ratings, and training data. After the model is generated with an optimal accuracy, a new task may be received from the task assigner server 112 (block 418). The example profile generator server 110 may input the new task into the generated model at block 420. Thereafter, the model may generate a task affinity by outputting one or more affinities based on the new task and the one or more work profiles (block 422). Thereafter, the example process 400 ceases operation.

Figure 5:
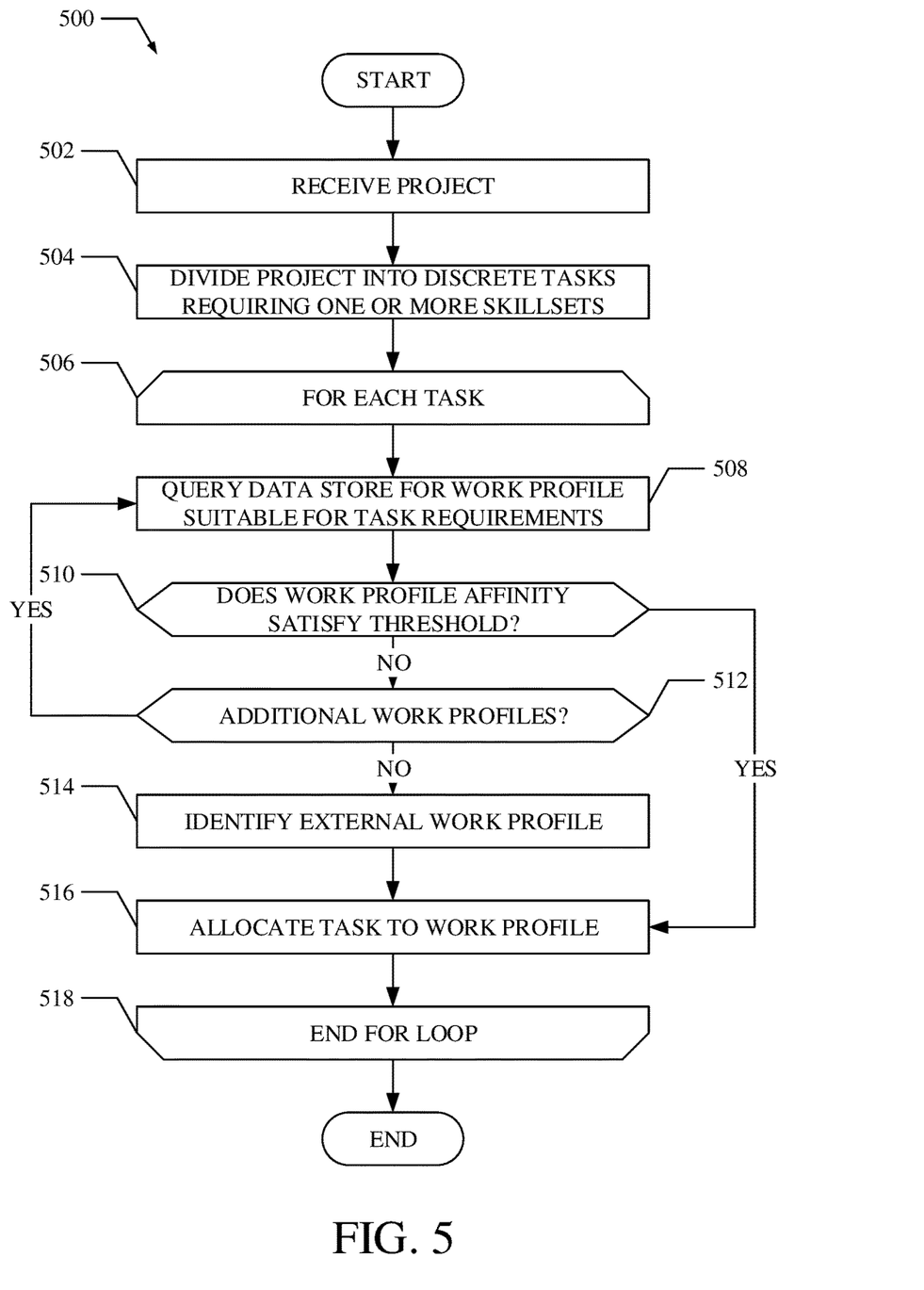

FIG. 5 illustrates a flow chart representative of machine readable instructions that, when executed, may cause a computing device to implement a process 500 to allocate components to one or more work profiles. The example process 500 begins at block 502. At block 502, the task assigner server 112 receives a task from a requesting entity. In some examples, the task requires one or more skillsets. The task assigner server 112 may divide the task into discrete components based on the one or more skillsets (block 504). For example, the task may be divided such that each task is associated with one skillset. A for loop (or any other method) may begin at block 506, executing blocks 508-516 for each task. For example, at block 508 the example task assigner server 112 may query the database server 118 for a work profile associated with the skillset required by the task. In some examples, multiple work profiles may be associated with the skillset required by the task. Accordingly, the example task assigner server 112 may determine whether an affinity (output by the model generated by the profile generator server 110 with respect to the task) for each work profile satisfies a threshold (block 510). The threshold may be a static number such at 0.90, may be a function such as identify the work profile with the highest affinity, and/or the like. If the affinity for a work profile fails to satisfy the threshold (block 510: NO), control proceeds to block 512.

At block 512, the example task assigner server 112 determines whether there are additional work profiles. For example, because the first located work profile had an affinity that did not satisfy the threshold, another work profile may be located. If the example task assigner server 112 determines there are additional work profiles (block 512: YES), control returns to block 508. If the example task assigner server 112 determines there are no more work profiles (block 512: NO), control proceeds to block 514. At block 514, no work profiles may be located that satisfy the affinity threshold so the task assigner server 112 may locate an external work profile. In some examples, the external work profile may be from a third party (e.g., a contractor, sub-contractor, temporary worker, and/or the like.).

After block 514, or if the affinity for a work profile satisfies the threshold (block 510: YES), control proceeds to block 516. At block 516, the example task assigner server 112 allocates the task to the identified work profile. In some examples, each task is allocated to a single work profile, which is associated with a single user (e.g., worker). In some examples further disclosed herein, a task may be allocated to a combined work profile. At block 518, the for loop ends. The example process 500 ceases operation thereafter.

Figure 6:
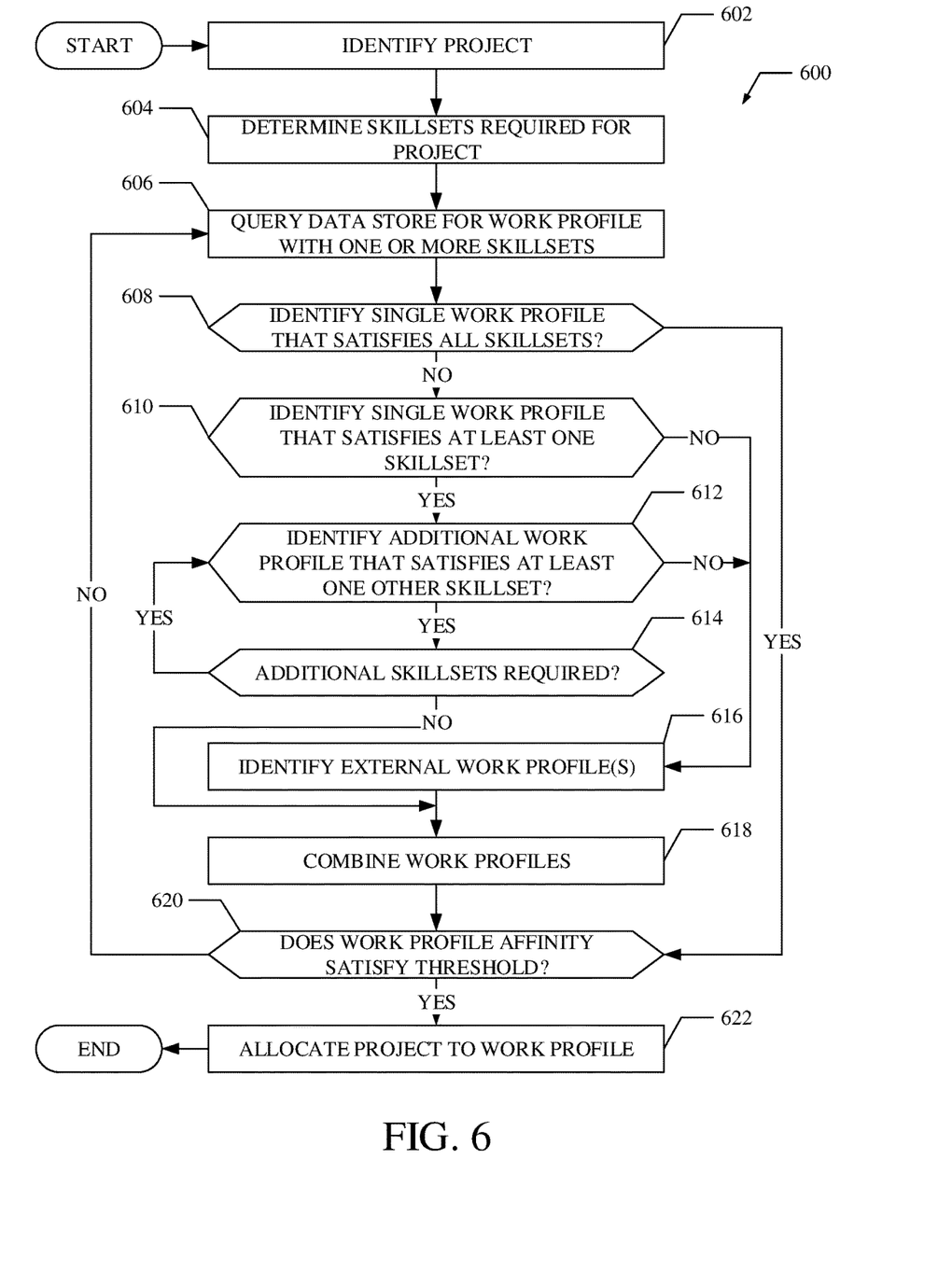

FIG. 6 illustrates a flow chart representative of machine readable instructions that, when executed, may cause a computing device to implement a process 600 to allocate a task to a single work profile or a combined work profile. The example process 600 begins at block 602. At block 602, the task assigner server 112 identifies a task. At block 604, the example task assigner server 112 determines the skillsets required by the task. The example task assigner server 112 then queries the database server 118 for work profiles associated with the one or more skillsets required by the task. At block 608, the example task assigner server 112 determines whether there is a single work profile that satisfies all the skillsets required by the task. If the example task assigner server 112 determines that there is not a single work profile that satisfies all the skillsets required by the task (block 608: NO), control proceeds to block 610.

At block 610, the example task assigner server 112 determines whether there is a single work profile that satisfies at least one the skillset required by the task. If the example task assigner server 112 determines that there is a single work profile that satisfies at least one skillset required by the task (block 610: YES), that work profile is earmarked, stored, or otherwise saved and control proceeds to block 612. At block 612, the example task assigner server 112 determines whether there is an additional work profile that satisfies at least one other skillset required by the task. If the example task assigner server 112 determines that there is an additional work profile that satisfies at least one other skillset required by the task (block 612: YES), that work profile is earmarked, stored, or otherwise saved and control proceeds to block 614. At block 614, the example task assigner server 112 determines whether there are additional skillsets required for which the example task assigner server 112 has not previously found work profiles. If the example task assigner server 112 determines that there are additional skillsets required for which the example task assigner server 112 has not previously found work profiles (block 614: YES), control returns to block 612.

If at block 610, the example task assigner server 112 determines that there is not a single work profile that satisfies at least one skillset required by the task (block 610: NO), control proceeds to block 616. At block 616, the example task assigner server 112 has not found any work profiles that satisfy at least one skill set required by the task and identifies one or more external work profiles, such as from a third party. The example task assigner server 112 then earmarks, stores, or otherwise saves the one or more external work profiles. After block 616, or if the example task assigner server 112 determines at block 614 that there are no additional skillsets required for which the example task assigner server 112 has not previously found work profiles (block 614: NO), control proceeds to block 618.

At block 618, the example task assigner server 112 combines the earmarked, stored, or otherwise saved work profiles into a combined work profile. For example, the combined work profile may comprise a first work profile associated with a first skillset required by the task, a second work profile associated with a second skillset required by the task, a third work profile associated with a third skillset required by the task, and so on and so forth. In such an example, a single combined work profile may be allocated a task component or task. At block 620, the example task assigner server 112 may determine whether an affinity (output by the model generated by the profile generator server 110 with respect to the task component or task) for the work profile satisfies a threshold (block 410). The threshold may be a static number (e.g., 0.90) or may be a function such as identify the work profile with the highest affinity, identify the first work profile of a plurality work profiles, and/or the like. If the affinity for the work profile fails to satisfy the threshold (block 620: NO), control returns to block 606. However, if the affinity for the work profile satisfies the threshold (block 620: YES), control proceeds to block 622. At block 622, the task component or task is allocated to either the single work profile identified at block 608 or the combined work profile generated at block 618. Thereafter, the example process 600 ceases operation.

While the above disclosure references identifying components and work profiles on the basis of skillsets, other parameters of a task may be used as similarly described above.

Figure 7:
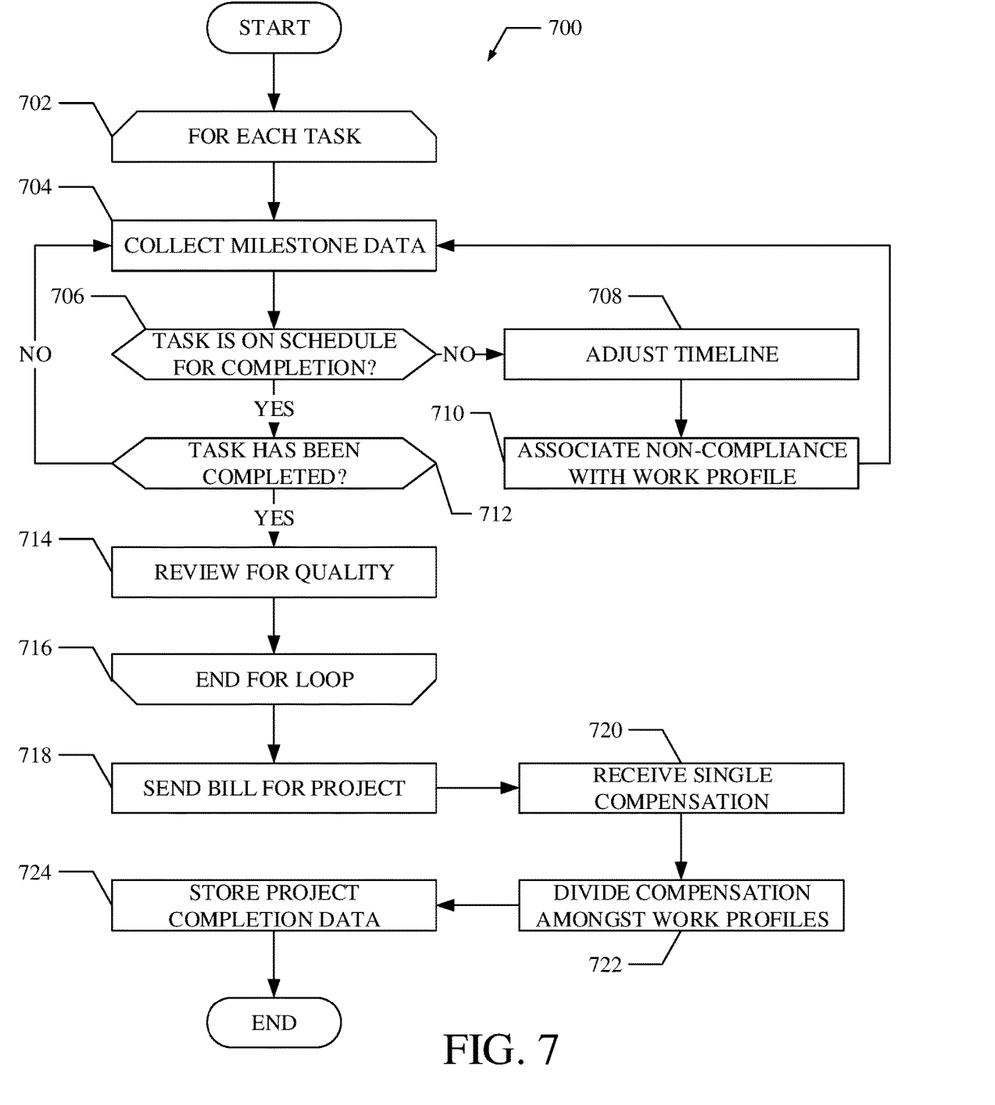

FIG. 7 illustrates a flow chart representative of machine readable instructions that, when executed, may cause a computing device to implement a process 700 to review allocated components and process completed components. The example process 700 begins at block 702. A for loop (or any other method) may begin at block 702, executing blocks 704-712 for each allocated task or task. For example, for each allocated component or task, the example task processor server 114 may collect milestone data (block 704). Such data may include progress of work, number of resources consumed, time elapsed, and/or the like. The milestone data may be collected periodically based on time, task component steps, cost, and/or the like. Based on the milestone data, the example task processor server 114 may determine whether the task component and/or task is on schedule for completion based on the task parameters at the time the task component and/or task was allocated (block 706).

If the task component and/or task is not on schedule for completion (block 706: NO), control proceeds to block 708. At block 708, the example task processor server 114 adjusts the timeline for the task component and/or task. In some examples, the timeline is adjusted to reflect the pace of the task component and/or task. In some examples, the timeline is adjusted according to an acceptable standard deviation (e.g., ±3 days). At block 710, the example task processor server 114 may update the work profile to associate non-compliance of the task component and/or task timeline. Thereafter, control returns to block 704.

If the task component and/or task is on schedule for completion (block 706: YES), control proceeds to block 712. At block 712, the task processor server 114 determines whether the task component and/or task has been completed. If the task component and/or task has not been completed (block 712: NO), control returns to block 704. If the task component and/or task has been completed (block 712: YES), control proceeds to block 714. At block 714, the example task processor server 114 reviews the completed task component and/or task for quality. For example, if the task and/or components involve software, the task processor server 114 may compile the code, perform one or more software tests, and/or the like. The task processor server 114 may compare the completed components and/or task to one or more known standards or one or more standards defined by the parameters of the task request. In some examples, if the quality of the task component and/or task is below a threshold, the task component and/or task may be resubmitted through the processes disclosed herein. However, the disclosed selection of work profiles by the present systems, methods, and apparatus should decrease the frequency of such resubmissions.

At block 716, the for loop ends once each task has been processed. Because each component of the task has been processed and determined to have been completed, the task processor server 114 may process compensation for the task. Thus, at block 718, the task processor server 114 sends a bill to the entity requesting the task be completed. In some examples, the task processor server 114 may send multiple bills, wherein each bill is associated with a single task.

In some examples, the task processor server 114 sends one bill for the total cost of the task. In such examples, the task processor server 114 receives a single compensation amount for the task (block 720). The task processor server 114 may divide the single compensation amount for the task amongst the work profiles associated with the completed components (block 722). In some examples, the division of the compensation is based on amount of time spent, values of particular skillsets, quality of completed work, and/or the like. At block 724, the task processor server 114 stores completion data for the components and/or tasks. In some examples, the task processor server 114 provides this data to the profile generator server 110 and/or the database server 118 to update work profiles based on real-time task allocation and completion. In such examples, the model generated by the profile generator server 110 is continuously updated as work is completed. Thereafter, the example process 700 ceases operation.

The above discussed embodiments are simply examples, and modifications may be made as desired for different implementations. For example, steps and/or components may be subdivided, combined, rearranged, removed, and/or augmented; performed on a single device or a plurality of devices; performed in parallel, in series; or any combination thereof. Additional features may be added.

The invention claimed is:

1. A system comprising:
a task assigner server comprising:
one or more first processors; and
memory comprising first instructions, that when executed by the one or more first processors, cause the task assigner server to:
receive, from a first computing device, task information identifying a plurality of skillsets associated with a task;
based on receiving the task information, request, from a database server, at least one work profile associated with at least one skillset of the plurality of skillsets associated with the task;
receive, from the database server, the at least one work profile associated with the at least one skillset, wherein the at least one work profile associated with at least one skillset comprises an identifier associated with a second computing device;
determine whether an affinity between a component of the task and the at least one work profile associated with the at least one skillset satisfies a threshold; and
in response to determining that the affinity between the component of the task and the at least one work profile associated with the at least one skillset satisfies the threshold, allocate, to the at least one work profile, the component of the task; and
a task processor server comprising:
one or more second processors; and
memory comprising second instructions, that when executed by the one or more second processors, cause the task processor server to:
monitor progress information associated with one or more allocated components of the task;
based on monitoring the progress information, identify that the allocated component of the task has been completed; and
based on determining that the allocated component of the task has been completed, transmit, to the second computing device, compensation information associated with the allocated component of the task.

2. The system of claim 1, wherein to allocate, to the at least one work profile, the component of the task, the first instructions, when executed by the one or more first processors, cause the task assigner server to generate one or more commands directing the second computing device to execute one or more actions associated with the task; and send, to the second computing device, the one or more commands directing the second computing device to execute the one or more actions associated with the task.

3. The system of claim 1, wherein to receive the at least one work profile associated with the at least one skillset of the plurality of skillsets, the first instructions, when executed by the one or more first processors, cause the task assigner server to
divide the task into a plurality of components of the task, wherein each component of the task of the plurality of components of the task is associated with a skillset of the plurality of skillsets; and
receive a respective work profile for each component of the task of the plurality of components of the task.

4. The system of claim 3, wherein the first instructions, when executed by the one or more first processors, cause the task assigner server to divide the task into the plurality of task components based on at least one of type of skillset, amount of work, confidentiality, urgency, or any combination thereof.

5. The system of claim 1, wherein the at least one work profile is a combined profile comprising at least a first work profile and a second work profile, wherein the first work profile is associated with a first user having a first skillset of the plurality of skillsets and the second work profile is associated with a second user having a second skillet of the plurality of skillsets.

6. The system of claim 1, further comprising a profile generator server comprising:
one or more third processors; and
memory comprising third instructions, that when executed by the one or more third processors, cause the profile generator server to:
receive user-defined parameters associated with at least one user;
receive auxiliary data associated with the at least one user;
generate, based on received user-defined parameters and auxiliary data, the at least one work profile; and
generate the affinity between the task component and the generated at least one work profile.

7. The system of claim 6, wherein the third instructions, when executed, cause the profile generator to generate a model based on the at least one work profile, wherein the component of the task is an input to the generated model and the affinity is an output of the generated model.

* * * * *

UNITED STATES PATENT AND TRADEMARK OFFICE
CERTIFICATE OF CORRECTION

PATENT NO. : 10,387,203 B2
APPLICATION NO. : 15/497917
DATED : August 20, 2019
INVENTOR(S) : Manu Kurian Page 1 of 1

It is certified that error appears in the above-identified patent and that said Letters Patent is hereby corrected as shown below:

In the Claims

Column 16, Line 14:
In Claim 3, after "to", insert --:--

Column 16, Line 32:
In Claim 5, delete "skillet" and insert --skillset--

Signed and Sealed this
Tenth Day of November, 2020

Andrei Iancu
*Director of the United States Patent and Trademark Office*